J. W. GAEDE.
VISE.
APPLICATION FILED DEC. 13, 1913.
1,196,772.   Patented Sept. 5, 1916.
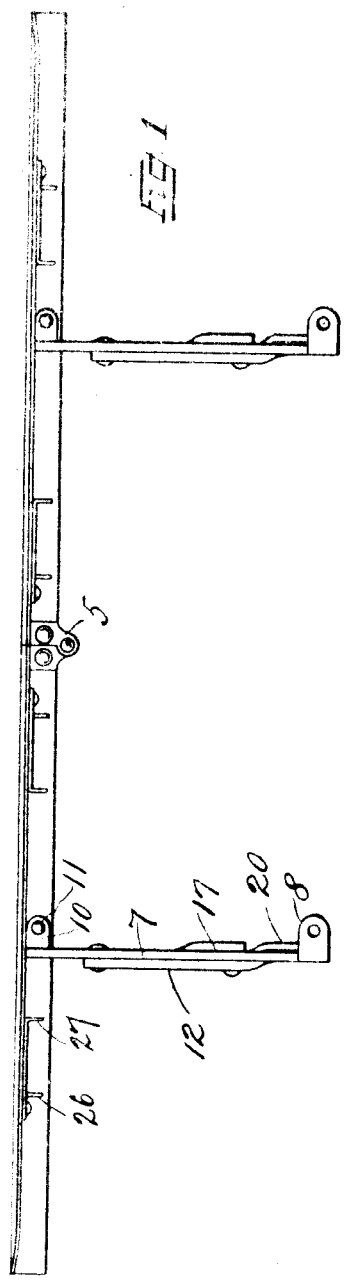
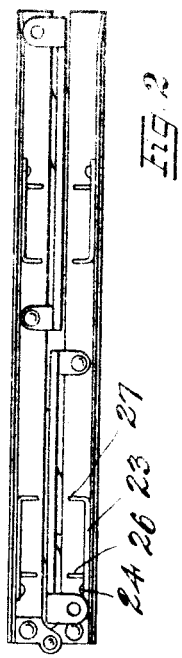
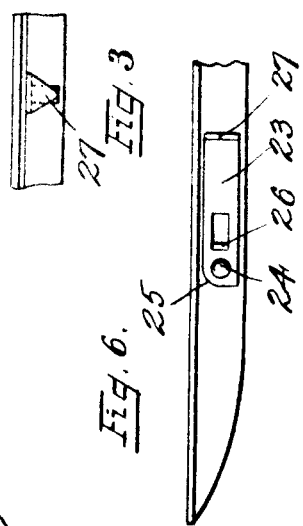
Witnesses
F. C. Valentine
C. W. Tresch
Inventor
John W. Gaede
By B. W. Brockett
Attorney

UNITED STATES PATENT OFFICE.

JOHN W. GAEDE, OF CLEVELAND, OHIO.

VISE.

1,196,772.　　　　Specification of Letters Patent.　　Patented Sept. 5, 1916.

Application filed December 13, 1913. Serial No. 806,425.

*To all whom it may concern:*

Be it known that I, JOHN W. GAEDE, a citizen of the United States, residing at Cleveland, in the county of Cuyahoga and State of Ohio, have invented certain new and useful Improvements in Vises, of which the following is a specification.

This invention relates to vises generally and particularly to that class of such devices utilized for holding saws while being sharpened.

More specifically the invention relates to saw vises of collapsible form comprising a double pair of clamping jaws hinged together with clamping mechanism arranged in conjunction with each pair.

The invention also relates to the arrangement of the parts whereby they may be folded together in small compass, and to certain other details as set forth herein.

The invention may be further briefly summarized as consisting in the construction and combination of parts hereinafter set forth in the following description, drawings and claims.

Referring to the drawings, Figure 1 is a rear elevation of the device; Fig. 2 is a similar view with the parts folded together; Fig. 3 is a side elevation of a portion of one of the jaws showing the securing clip in its outward position; Fig. 4 is a section through the jaws showing the securing clip in its outward position; Fig. 5 is a similar view with the jaws open and with the clip removed; and Fig. 6 is a bottom plan view of one of the clips.

In carrying out the invention any preferred form and construction of parts may be employed so long as they possess the necessary characteristics, but I have shown one arrangement in the drawings which is effective in operation, and in such embodiment I have shown the device as comprising two pairs of clamping jaws hinged together so that they will fold one upon the other and each pair consists of a stationary jaw 1 having an outwardly and downwardly extending flange 2 and a movable jaw 3 also provided with an outwardly and downwardly curved flange 4. As before suggested there are two pairs of these jaws and they are hinged together by means of suitable hinges 5 so that the ends of the pairs of jaws abut as shown in Fig. 1, and when folded together the lower edges of the clamping members come together, as shown in Fig. 2. In order to increase the holding action of the jaws and prevent the slipping of the saw, I prefer to provide one of the members, as the member 3, with a rubber facing 6, which is vulcanized or otherwise secured to the clamping face.

Each pair of jaws is provided with suitable clamping mechanism, and this mechanism consists of a support 7 having an ear 8 provided with an opening through which a screw may pass for securing the support to a bench or other article. This supporting member 7 has one of its arms 9 extending upward and provided with an ear 10 bent at right-angles to the arm and pivoted by a pivot 11 to the stationary clamping member 1. The supporting member 7 is also provided with another upwardly extending arm 12 offset as shown in Fig. 1 just above the supporting member 7. Pivotally connected to the upper end of this arm 12 by means of a pivot 13 is a clamping lever 14 which is provided with an ear 15 extending in the same direction as the ear 10 and pivoted by means of a pin or rivet 16 to the movable clamping jaw 3. The lower end of the lever has an offset portion 17 provided with a slot 18 which receives a crank pin 19 mounted upon a crank lever 20 pivoted upon a pin 21 secured to the arm 12. This crank lever 20 is offset so as to extend to one side of the supporting member 7 and is provided with a thumb piece 22.

From the arrangement of the parts it will be seen that when the crank lever 20 is in its downward position, as shown in Fig. 4, the lower end of the clamping lever 14 will be thrown outward and the clamping jaws will be thrown together, as shown in this figure, but when the lever is moved upward, as shown in Fig. 5, the clamping jaws will be open. The ears 10 and 15 of the two clamping mechanisms are turned in the same direction, as shown in Fig. 1, and each is pivoted at about the center of the jaws so that they may be swung upward against the undersides of the jaws, and when swung in this position they will nest nicely between the pairs of jaws when they are collapsed, as shown in Fig. 2.

In order to form a securing means for the upper portion of the vise I provide suitable clips which may be swung out over the top of a bench or ledge, and each of these clips comprises a plate portion 23 mounted upon a rivet or pin 24 secured in the flange 2 of each stationary clamping member. Each plate portion is rounded at 25 so as to permit the device to swing on the pivot and is also provided with a lug 26 pressed out of the metal and extending downward and forming a stop for engaging the side face of the bench or ledge. The outer end of the plate portion 23 is provided with an angular projection 27 for engagement in the material of the bench or ledge.

Having described my invention, I claim:—

1. In a vise, folding clamping jaws, and folding clamping mechanism for said jaws.

2. A vise comprising two pairs of clamping jaws, means connecting said pairs and adapted to permit their being folded one upon the other, and clamping means for said jaws adapted to fold between the two pairs of jaws.

3. A vise comprising two pairs of coöperating jaws hinged together to form, when extended, one continuous clamp, and clamping means for said jaws connected thereto.

4. A vise comprising two pairs of coöperating jaws hinged together to form, when extended, one continuous clamp, and clamping means for each pair of jaws pivotally connected to the corresponding pair of jaws.

5. A vise comprising two pairs of coöperating jaws hinged together to form, when extended, one continuous clamp, and clamping means for each pair of jaws comprising a supporting member connected to one jaw of the pair, a clamping lever connected to the other jaw, and means between the supporting member and the clamping lever for closing the jaws.

6. In a vise, two pairs of clamping jaws collapsibly connected together at their ends, a clamping device for each pair, pivotal connections between each clamping device and its jaws, said pivotal connections being located such that the clamping device of one pair of jaws will fold toward the center and the clamping device of the other pair will fold toward the end of its jaws, whereby when the jaws are folded together said clamping devices will nest in the same plane between the pairs of jaws.

7. In a vise, two pairs of clamping jaws, locked pairs of jaws being hinged together, clamping mechanism pivotally connected at the center of each pair of jaws, the clamping device of one pair being adapted to fold against the underside of its jaws toward the center and the clamping device of the other pair being adapted to fold against the underside of its jaws toward the outer or free end.

8. A vise comprising a pair of clamping members, clamping means therefor, and supporting means for the upper part of the clamp comprising a clip consisting of a plate portion, a stop struck up from the material of the plate portion, and a hook at the end of the plate portion and bent downward therefrom.

In testimony whereof I affix my signature in presence of two witnesses as follows.

JOHN W. GAEDE.

Witnesses:
ALTON H. BEMER,
C. H. TRESCH.